United States Patent
Graze et al.

(10) Patent No.: US 7,737,683 B2
(45) Date of Patent: Jun. 15, 2010

(54) PROCESS AND DEVICE FOR ELECTROMAGNETICALLY BASED DETECTION OF FIELD-INFLUENCING PARTS IN A MATERIAL FLOW

(75) Inventors: Bernd Graze, Graz (AT); Michael Kiss, Graz (AT); Bernhard Kohla, Graz (AT)

(73) Assignee: Peter Kerschhaggl (AT)

(*) Notice: Subject to any disclaimer, the term of this patent is extended or adjusted under 35 U.S.C. 154(b) by 758 days.

(21) Appl. No.: 10/577,221

(22) PCT Filed: Oct. 12, 2004

(86) PCT No.: PCT/AT2004/000346

§ 371 (c)(1),
(2), (4) Date: Jan. 18, 2007

(87) PCT Pub. No.: WO2005/043195

PCT Pub. Date: May 12, 2005

(65) Prior Publication Data

US 2007/0126420 A1    Jun. 7, 2007

(30) Foreign Application Priority Data

Oct. 28, 2003    (AT) ................................ 1707/2003

(51) Int. Cl.
*G01N 27/74*    (2006.01)
(52) U.S. Cl. ...................... 324/204; 324/242
(58) Field of Classification Search .................. 324/204
See application file for complete search history.

(56) References Cited

U.S. PATENT DOCUMENTS

| | | | | |
|---|---|---|---|---|
| 5,001,424 | A | * | 3/1991 | Kellett et al. ................. 324/204 |
| 5,034,689 | A | * | 7/1991 | Inoue et al. .................. 324/225 |
| 5,045,789 | A | * | 9/1991 | Inoue et al. .................. 324/225 |
| 5,315,243 | A | * | 5/1994 | Kempster et al. ........... 324/204 |

(Continued)

FOREIGN PATENT DOCUMENTS

DE    19521266 C1 *    2/1997

(Continued)

*Primary Examiner*—Jay M Patidar
(74) *Attorney, Agent, or Firm*—Lowe Hauptman Ham & Berner, LLP

(57) ABSTRACT

A device for detecting parts in a material flow which influence an electromagnetic alternating field comprises an oscillator (1) and at least one transmitting coil (2) for generating an electromagnetic alternating field extending across the width of a conveying distance of the material flow. At least one detector coil (4) comprising two windings (4a, 4b) connected inversely detects the electromagnetic alternating field and generates a detection signal (DS), the phase signal portion (PS') of which is detected by means (7), from the relative motion between the alternating field and a field-influencing part. The phase signal portion (PS) and the amplitude signal portion (AS) of the detection signal are supplied to means (12) for forming a locus curve from the detection signal, which means form pairs of variates at the respective points of time from the progressions of the phase signal portion and the amplitude signal portion of the detection signal and plot these pairs of variates as a locus curve (15, 20, 30) in a system of coordinates. The locus curve (15, 20, 30) is analyzed by means (14) for evaluating the locus curve with respect to material-specific characteristics and for emitting an identification signal (ES) upon detection of a material-specific characteristic.

34 Claims, 3 Drawing Sheets

Figure 1:
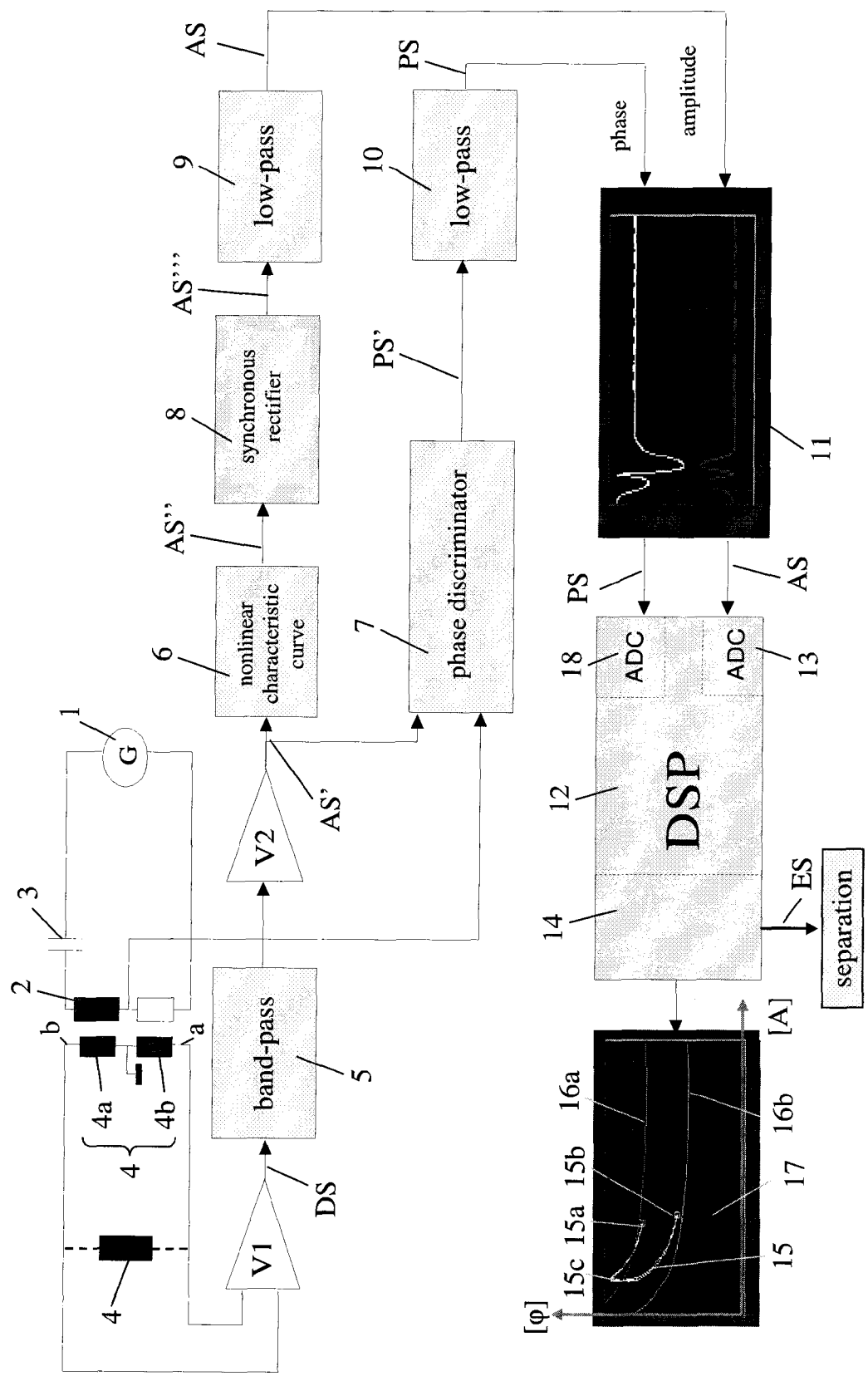

U.S. PATENT DOCUMENTS 6,816,794 B2　11/2004　Alvi
7,061,236 B2　6/2006　Britton

FOREIGN PATENT DOCUMENTS

| DE | 0862067 A1 | * | 9/1998 |
| EP | 0353035 A2 | * | 1/1990 |
| EP | 1339065 A2 | * | 8/2003 |

* cited by examiner

PROCESS AND DEVICE FOR ELECTROMAGNETICALLY BASED DETECTION OF FIELD-INFLUENCING PARTS IN A MATERIAL FLOW

FIELD

The invention relates to a process for detecting and distinguishing, respectively, parts in a material flow which influence an electromagnetic alternating field, comprising the generation of an electromagnetic alternating field extending across the width of the material flow, the generation of a relative motion between the electromagnetic field and the material flow, and the detection of a phase signal portion and an amplitude signal portion of a detection signal by means of a detector coil comprising two windings connected inversely, which detector coil is arranged in the effective range of the electromagnetic alternating field, with the detection signal being derived from a variation of magnetic flux caused by the relative motion between the electromagnetic alternating field and a part located in the material flow and influencing the electromagnetic alternating field.

Furthermore, the invention relates to a device for detecting and distinguishing, respectively, parts in a material flow which influence an electromagnetic alternating field, comprising an oscillator and at least one transmitting coil for generating an electromagnetic alternating field extending across the width of a conveying distance of the material flow, at least one detector coil comprising two windings connected inversely for detecting the electromagnetic alternating field and for generating a detection signal induced by a relative motion between a part located in the material flow and influencing the electromagnetic alternating field and the electromagnetic alternating field in the detector coil, as well as to means for detecting a phase signal portion of the detection signal.

Such a process and such a device are known from German patent DE 195 21 266 C1. They are required, for example, in the recycling technology for the determination of metal particles in a delivery flow essentially consisting of metal-free materials, such as glass, plastic or paper, in order to discard the determined metal particles from the material flow before the material flow is supplied to a recycling plant. However, due to an increasing environmental awareness and rising raw material costs, it has been shown that a rough division into metallic and nonmetallic particles and substances, respectively, is often not sufficient for achieving the desired recycling result. This prompted the industry to demand detection devices by means of which different kinds of metals and alloys can also be distinguished, or more in general, by means of which it is possible to differentiate between different kinds of substances in a material flow which influence an electromagnetic alternating field.

A first approach with regard to fulfilling those demands is already provided by the device disclosed in DE 195 21 266 C1 for determining electrically conductive parts in a non-conductive delivery flow. With this device, an electromagnetic alternating field is established by an A.C. generator via a transmitting coil system in a section of the delivery flow to be monitored, whereby the amplitude and phase changes of the alternating field, which are triggered when passing through a part, are detected by a receiving coil system and a subsequent evaluation circuit in the form of a phase change signal and an amplitude change signal. A stage for the vectorial addition of the two change signals and a phase comparator are provided. The vectorial sum signal and one of the two change signals are supplied to the phase comparator. The output signal (phase angle signal) of the phase comparator corresponds to the phase angle between the vectorial sum signal and one of the two change signals. The phase angle signal is supplied to an evaluation stage in which it is transformed into a control signal evaluated in a material-specific way, which control signal controls a controllable output stage which emits a material-specific identification signal for a part to be detected which is located in the delivery flow. By means of this device it is possible, for example, to differentiate between an aluminium foil present in a delivery flow made up of plastic scraps, which aluminium foil need not be discarded, and solid but small particles of other metals such as, e.g., iron screws. However, the known device has the disadvantage that the distinction between different kinds of electrically conductive parts can only be made on the basis of relatively simple criteria such as a particular phase angle range or a particular amplitude range. The document cites as an example that the responsiveness for the phase angle of a non-spurious part such as an aluminium foil can be significantly reduced or even zeroed. It is understood that, with those simple criteria, a relatively low preciseness can be achieved if the parts have varying sizes and in case of material blends.

The present invention is based on the object of solving or at least alleviating the problems inherent to the prior art. In particular, the invention provides a process and a device for detecting and distinguishing, respectively, parts in a material flow which influence an electromagnetic alternating field, are robust in their mode of operation with respect to varying sizes of such parts in the material flow and permit the detection of a variety of different kinds of parts in the material flow which influence an electromagnetic alternating field. Furthermore, in the process according to the invention and the device according to the invention, the function of the detection of parts influencing an electromagnetic alternating field is designed in such a flexible way that even material blends will not result in any significant impairment of the preciseness during detection.

The object according to the invention is achieved by developing further the initially mentioned process for detecting and distinguishing, respectively, parts in a material flow which influence an electromagnetic alternating field according to the characterizing features of claim 1, as well as by developing further the initially mentioned device for detecting and distinguishing, respectively, parts in a material flow which influence an electromagnetic alternating field according to the characterizing features of claim 13. Advantageous embodiments of the invention are illustrated in the subclaims.

The process according to the invention for detecting and distinguishing, respectively, parts in a material flow which influence an electromagnetic alternating field is characterized in that a locus curve is formed from the progression of the detection signal by plotting the progressions of the phase signal portion and the amplitude signal portion of the detection signal as pairs of variates at the respective points of time in a system of coordinates and that the locus curve is evaluated with respect to material-specific characteristics and an identification signal is emitted upon detection of a material-specific characteristic. The locus curve thus formed can be evaluated with regard to material-specific characteristics in a manner which is extremely flexible and robust with respect to errors, whereby, in a preferred embodiment, the evaluation is performed using image processing methods or pattern recognition methods. Suitable pattern recognition methods comprise the comparison of the locus curve with a predetermined, optionally adjustable, material-specific curve or a family of curves, wherein the individual curves of the family of curves can represent, for example, different purities, geometries or sizes of the detected part influencing the electromagnetic alternating field. In a further development of such a pattern recognition method, the comparison of the formed locus curve with a predetermined curve or family of curves includes the detection of at least one measured value of similarity and the comparison of the at least one measured value with at least one set value.

The term "parts influencing an electromagnetic alternating field" can be understood as covering not only all electrically conductive materials such as metals, alloys etc. but, for example, also composites in which electrically conductive particles are absorbed in an electrically insulating supporting material, wherein the composite, as a whole, is not electrically conductive, as well as magnetic materials, e.g., ferrites. In the following specification, the term "field-influencing parts" is likewise used for those materials.

In an alternative method of evaluating the locus curve, which can be realized with little calculative effort, the positions of characteristic points of the locus curve, preferably the inflection points or extrema thereof, are determined and the detected positions are compared to standard positions or limiting values or fringe ranges, respectively.

Suitably, the system of coordinates in which the locus curve is formed is a Cartesian or polar system of coordinates.

Simplifications in the evaluation of the locus curve emerge if the locus curve, before being evaluated by appropriate signal processing measures, is folded or shifted to only one or two quadrants of the selected system of coordinates. Such signal processing measures comprise the formation of the absolute value of the phase signal portion and/or the amplitude signal portion of the detection signal. A rectifier can advantageously be provided for the formation of the absolute value.

In order to avoid overmodulations of the circuits used for processing the detection signal or disadvantageous signal progressions of the detection signal, in an advantageous embodiment of the invention, the amplitude signal portion of the detection signal is adjusted via a nonlinear characteristic curve.

In a simple embodiment, the process according to the invention and the device according to the invention can be used for simple detection as to whether a part influencing the electromagnetic alternating field is located in a material flow with no influence on the field. In that case, only a yes/no information would be gathered from the identification signal which has been generated. However, the invention can preferably also be used for detecting different kinds of field-influencing parts in a material flow, for example, different kinds of steel. In such an embodiment of the invention, the identification signal is configured as a material-specific identification signal. The identification signal which has been generated can also be configured for activating means for the separation of the detected field-influencing parts from the material flow.

An improved examination of a material flow onto field-influencing parts can be obtained by dividing the material flow into several stripes which are examined separately. For this purpose, a plurality of detector coils are arranged across the material flow, whose detection signals are analyzed independently of each other by the formation and evaluation of locus curves.

In an embodiment of the invention which is preferred due to its compact design and its flexible application, the means for forming a locus curve and the means for evaluating the locus curve are designed as a signal processor, in particular a digital signal processor, wherein the means for forming a locus curve and the means for evaluating the locus curve are preferably integral with each other.

In order to filter out interfering signals in the detection signal supplied by the detection coil, a filter such as, e.g., a band-pass filter or a high-pass filter, is preferably arranged downstream of the detection coil. Similarly, a low-pass filter can be provided for forming the amplitude signal portion and/or the phase signal portion of the detection signal.

Figure 2:
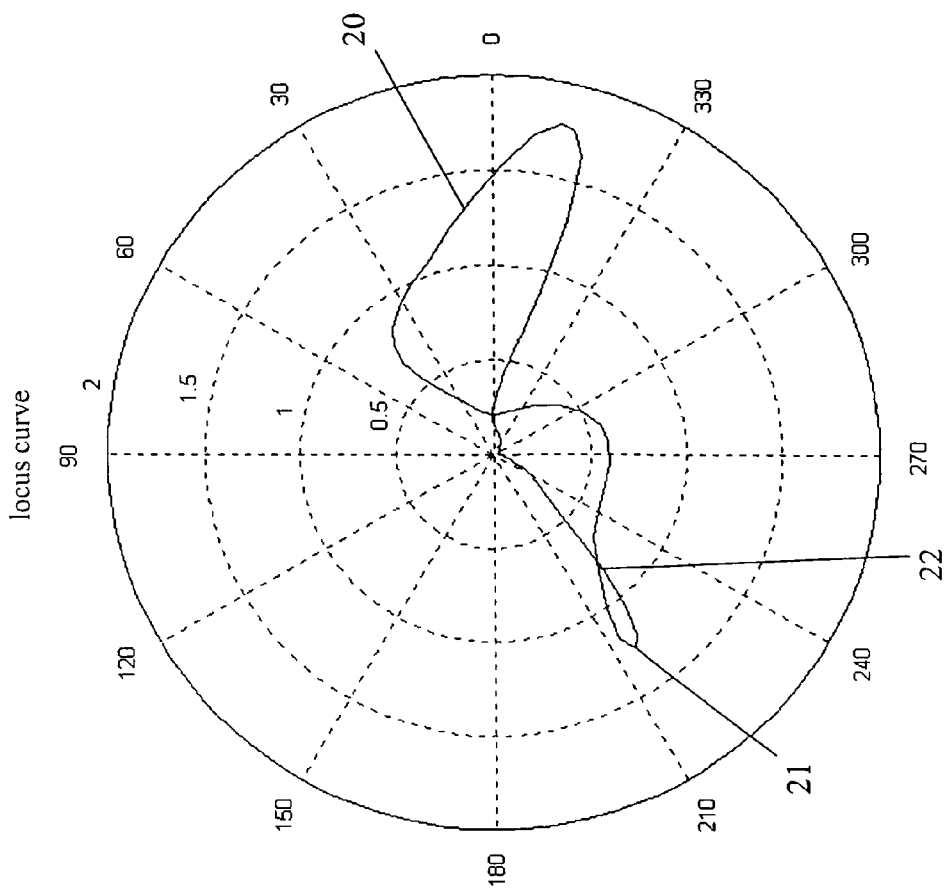
Figure 2:
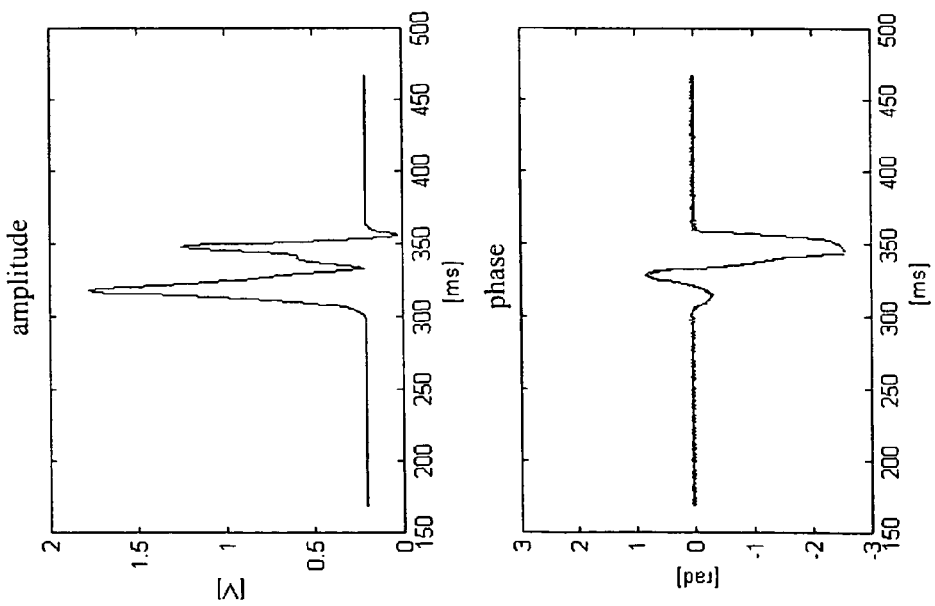
Figure 3:
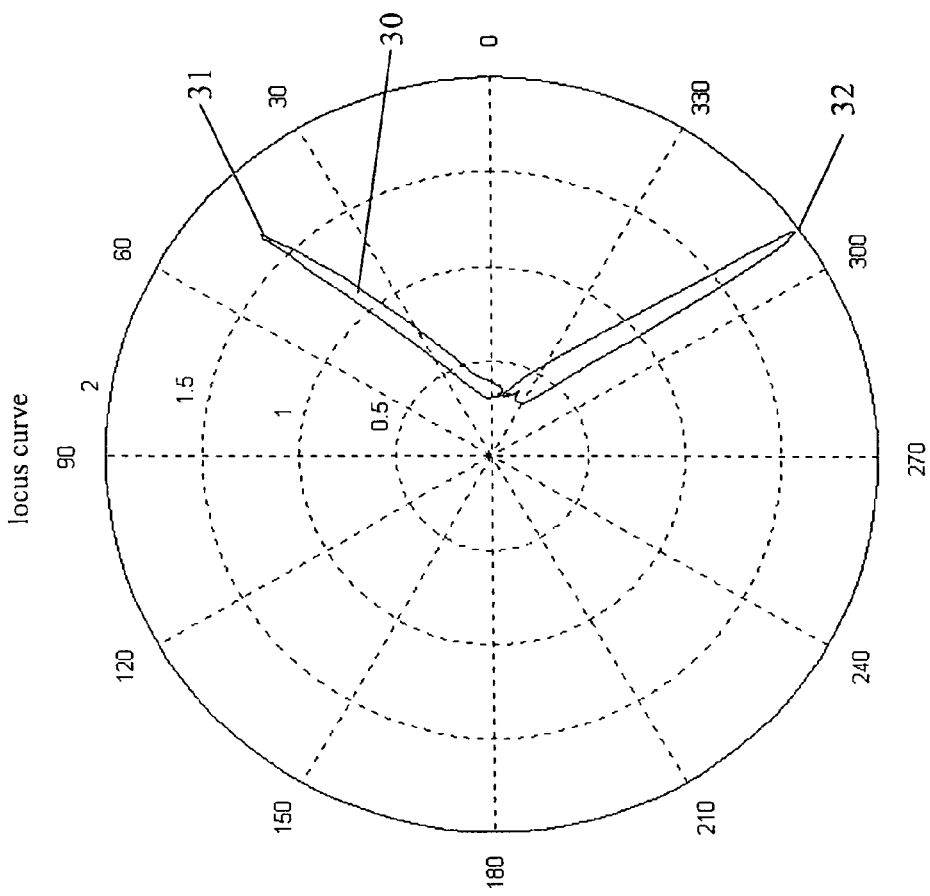
Figure 3:
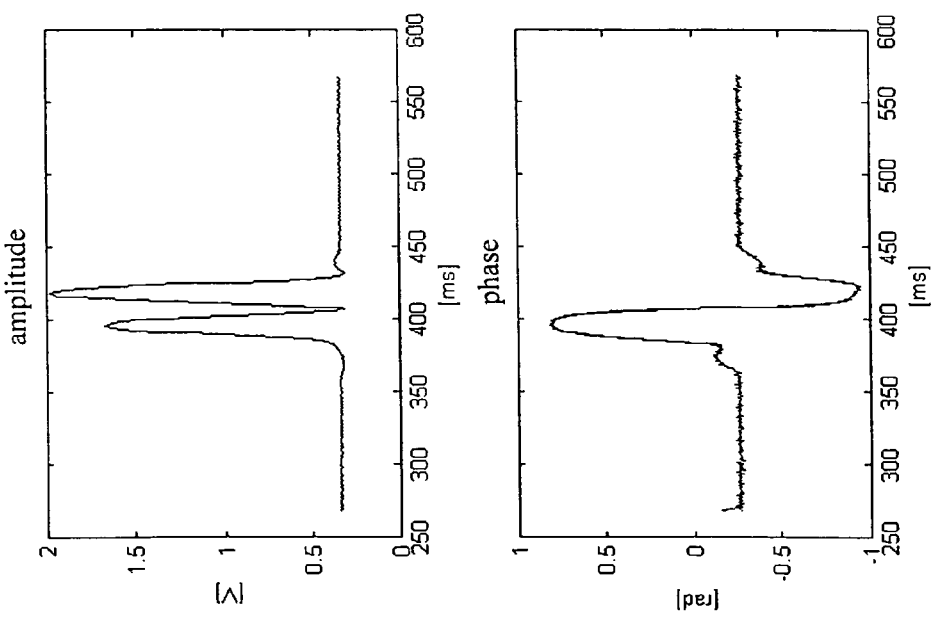

Below, the invention is illustrated further by way of a non-limiting exemplary embodiment with reference to the drawings. In the drawings:

FIG. 1 shows a block diagram of a device according to the invention for detecting and distinguishing, respectively, parts in a material flow which influence an electromagnetic alternating field;

FIG. 2 shows the phase signal portion and the amplitude signal portion of a detection signal within the time response as well as a locus curve for parts made of steel of type ST37, which locus curve is derived from said detection signal in accordance with the invention and illustrated in polar coordinates; and FIG. 3 shows the phase signal portion and the amplitude signal portion of a detection signal within the time response as well as a locus curve for parts made of chromium-nickel steel, which locus curve is derived from the detection signal in accordance with the invention and illustrated in polar coordinates.

With reference first to FIG. 1, therein is illustrated a block diagram of a device according to the invention for detecting and distinguishing, respectively, parts in a material flow which influence an electromagnetic alternating field. Said device comprises an oscillator 1 and at least one transmitting coil 2 for generating an electromagnetic alternating field. The oscillator 1 supplies the transmitting coil 2 with a continuous, preferably sinusoidal alternating voltage. A tuning capacitor 3 is connected in series with the transmitting coil 2 and forms an oscillating circuit therewith for generating the electromagnetic alternating field. The electromagnetic alternating field extends in a known manner across the width of a conveying distance of a material flow (not illustrated). Said material flow can comprise, for instance, glass, plastic, paper etc., i.e., basically materials which are electrically non-conductive. However, parts influencing the electromagnetic alternating field, such as metal pieces, can be contained in the material flow, which parts are supposed to be detected by the device according to the invention in order to be discarded subsequently from the material flow. Thereby, the material flow is moved in a known manner past the transmitting coil 2 either by a conveying means such as a conveyor belt or via a chute or in a free fall so that a relative motion will occur between the transmitting coil 2 (or the alternating field generated by the same, respectively) and the material flow. At least one detector coil 4 comprising two windings 4a, 4b connected inversely is located within the effective range of the electromagnetic alternating field generated by the transmitting coil 2. The electromagnetic alternating field induces an electric voltage in each of the windings 4a, 4b. The detector coil 4 is adjusted such that, in the stationary condition of the electromagnetic alternating field, the induced voltages will counterbalance each other by the inverse coupling of the windings 4a, 4b of the detector coil 4. The stationary condition of the electromagnetic alternating field is maintained until there are no more field-influencing parts in the material flow being moved past, which parts result in a transient change in the alternating field, which, in turn, involves varying voltages induced in the individual windings 4a, 4b and hence an output voltage at the terminals a, b of the detector coil 4 which is different from zero. The voltage signal calipered at the terminals a, b of the detector coil 4 is supplied to a differential amplifier V1 for amplification.

The output signal of the differential amplifier V1 is supplied as a detection signal DS to a band-pass filter 5 filtering out possible spurious portions in the detection signal DS. A second amplifier V2 for renewed amplification of the detection signal DS is attached to the band-pass filter. The output signal AS' from the amplifier V2 is supplied, on the one hand, to a phase discriminator 7, as described below in further detail, and serves, on the other hand, for processing the amplitude signal portion AS of the detection signal DS. For this purpose, the output signal AS' of the amplifier V2 is supplied to a circuit 6 for dynamic adjustment in which the signal AS' is transformed according to a predetermined or adaptively variable nonlinear characteristic curve. This signal transformation serves for dynamic adjustment and for the prevention of an overmodulation of subsequent switching steps. Signal AS" resulting therefrom is supplied to a synchronous rectifier 8 which rectifies said signal and sends it as a signal AS''' to a low-pass filter 9 filtering out high-frequency signal disturbances so that the processed amplitude signal portion AS of the detection signal DS will finally emerge at the output of the low-pass filter 9.

As mentioned above, the output signal AS' of the amplifier V2 is also supplied to the phase discriminator 7 which determines therefrom the phase shift of the detection signal with respect to the transmitting coil signal, expressed as a phase signal portion PS' of the detection signal, via a comparison with the alternating voltage signal supplied to the transmitting coil 2. The output signal PS' of the phase discriminator 7 is smoothed in a low pass 10, with a signal PS resulting therefrom which represents the phase signal portion of the detection signal DS.

For illustrative purposes, the phase signal portion PS and the amplitude signal portion AS of the detection signal DS are illustrated with respect to their time response in an oscilloscope image 11. The amplitude signal portion AS is supplied to an analog-to-digital converter 13, and the phase signal portion PS is supplied to an analog-to-digital converter 18. The analog-to-digital converters 13 and 18 are integral with a digital signal processor DSP which is designed as a means 12 for forming a locus curve from the digitized phase signal portion PS and amplitude signal portion AS of the detection signal DS by programming the digital signal processor DSP in such a way that the progressions of the phase signal portion PS and the amplitude signal portion AS are plotted as pairs of variates at the respective points bf time in a system of coordinates, resulting in the locus curve 15 illustrated in an oscilloscope image 17. Said locus curve 15 is imaged in the first quadrant of a Cartesian system of coordinates the abscissa of which indicates an amplitude A and the ordinate of which indicates a phase φ of the locus curve 15. Such a locus curve reduced to a quadrant occurs, for example, if both the phase signal portion PS and the amplitude signal portion AS are rectified prior to the formation of the locus curve. Similarly, however, it is also possible to perform the conversion or shift of a locus curve distributed over all four quadrants into a single quadrant in the digital signal processor DSP.

Within the signal processor DSP, i.e. in the means 12 for forming a locus curve, means 14 for evaluating the locus curve 15 with respect to material-specific characteristics and for emitting an identification signal ES upon detection of a material-specific characteristic in the locus curve 15 are implemented as well. Advantageously, the means 14 for evaluating the locus curve can be designed as image processing means or pattern recognition means. Furthermore, the means 14 for evaluating the locus curve can include predetermined, optionally adaptive, material-specific curves or families of curves, by means of which the locus curve thus formed or individual branches of the locus curve are compared. Said predetermined curves or families of curves represent, for example, different purities, geometries or sizes of field-influencing parts which might possibly occur in the material flow. Likewise, the means 14 for evaluating the locus curve can be designed such that they determine one or several measured values from the detected locus curve according to a predetermined pattern recognition method, which measured values are representative of the locus curve and compare these measured values with set values or set value ranges. In a further embodiment of the invention, the means 14 for evaluating the locus curve can be designed such that the positions of particular characteristic points of the locus curve, preferably the inflection points or extrema thereof, are determined and these determined positions are compared to standard positions or limiting values or fringe ranges, respectively. Said evaluation method is illustrated in the oscilloscope image 17. Thereby, the positions of the inflection points 15a and 15b of the locus curve 15 are determined and these positions are examined as to whether they are located above a predetermined upper limiting line 16a or below a predetermined limiting line 16b, respectively. Such a position of the inflection points 15a, 15b would suggest that the detected field-influencing part is made up of VA-steel. However, the inflection points 15a, 15b are actually positioned within the range defined by the limiting lines 16a, 16b, which allows the conclusion that the detected field-influencing part does not consist of VA-steel. Such an embodiment of the invention can advantageously be used in the utilization of automobile scrap for sorting out the valuable raw material VA-steel from the scrap material flow. Instead of the inflection points 15a, 15b of the locus curve 15, the position of its peak 15c could also be used for evaluation. Depending on the respective field of application of the invention, the means 14 for evaluating the locus curve can be designed such that an identification signal ES is emitted if a part is detected in a material flow the locus curve of which fulfills the predetermined material-specific characteristics or the identification signal is emitted if the characteristics are not fulfilled. The identification signal ES can be used for activating means (not illustrated) for the separation of the detected field-influencing part from the material flow.

As already shown above by way of using VA-steel as an example, the invention is not restricted to detecting the presence or non-presence of a field-influencing part in a material flow but can furthermore also differentiate between various kinds of field-influencing parts. In FIGS. 2 and 3, two examples of locus curves of field-influencing parts, established according to the invention, in a polar system of coordinates as well as the time responses of the amplitude signal portion and the phase signal portion of the associated detection signal are shown within the time response. FIG. 2 shows a locus curve 20 which is characteristic of steel of type ST37. For example, the position of a inflection point 21 or of a crossing point 22 can be used for evaluating said locus curve. Furthermore, the surface area of the area outlined by the locus curve 20 can be calculated and normalized. Higher developed pattern recognition methods can also be used for evaluating the locus curve, which methods determine one or several measured values from the progression of the locus curve 20 which measured values are compared to predetermined set values or set ranges typical of particular types of materials. FIG. 3 shows a locus curve 30 which is characteristic of chromium-nickel steel. In comparison to locus curve 20, it is possible to discern the outlined area which is significantly smaller and the extremely pointed curve progressions at the inflection points 31 and 32. These characteristics can be used, for example, for evaluating the locus curve 30.

The invention claimed is:

1. A process for detecting and distinguishing, respectively, parts in a material flow which influence an electromagnetic alternating field, comprising the generation of an electromagnetic alternating field extending across the width of the material flow, the generation of a relative motion between the electromagnetic field and the material flow, and the detection of a phase signal portion (PS) and an amplitude signal portion (AS) of a detection signal (DS) by means of a detector coil (4) comprising two windings (4*a*, 4*b*) connected inversely, which detector coil is arranged in the effective range of the electromagnetic alternating field, with the detection signal (DS) being derived from a variation of magnetic flux caused by the relative motion between the electromagnetic alternating field and a part located in the material flow and influencing the electromagnetic alternating field, characterized in that a locus curve (15, 20, 30) is formed from the progression of the detection signal (DS) by plotting the progressions of the phase signal portion (PS) and the amplitude signal portion (AS) of the detection signal (DS) as pairs of variates at the respective points of time in a system of coordinates and that the locus curve (15, 20, 30) is evaluated with respect to material-specific characteristics and an identification signal (ES) is emitted upon detection of a material-specific characteristic.

2. A process according to claim 1, characterized in that the system of coordinates in which the locus curve (15, 20, 30) is formed is a cartesian or polar system of coordinates.

3. A process according to claim 1, characterized in that the absolute value of the phase signal portion (PS) and/or the amplitude signal portion (AS) of the detection signal (DS) is used for forming the locus curve (15, 20, 30).

4. A process according to claim 1, characterized in that the amplitude signal portion (AS') is adjusted via a nonlinear characteristic curve.

5. A process according to claim 1, characterized in that the evaluation of the locus curve (15, 20, 30) is performed using an image processing method.

6. A process according to claim 1, characterized in that the evaluation of the locus curve (15, 20, 30) is performed using a pattern recognition method.

7. A process according to claim 6, characterized in that the pattern recognition method comprises the comparison with a predetermined material-specific curve or a family of curves, wherein the individual curves of the family of curves represent different purities, geometries or sizes of the detected part influencing the electromagnetic alternating field.

8. A process according to claim 7, characterized in that the comparison of the formed locus curve (15, 20, 30) with a predetermined curve or family of curves includes the detection of at least one measured value of similarity and the comparison of the at least one measured value with at least one set value.

9. A process according to claim 7, wherein the predetermined material-specific curve or family of curves is adjustable.

10. A process according to claim 1, characterized in that the evaluation of the locus curve includes the determination of the position of points of the locus curve and the comparison of these positions with preset positions or limit values or limit ranges (16*a*, 16*b*), respectively.

11. A process according to claim 1, characterized in that the identification signal (ES) is configured as a material-specific identification signal.

12. A process according to claim 1, characterized in that the identification signal (ES) activates means for the separation of the detected part influencing the electromagnetic alternating field from the material flow.

13. A process according to claim 12, wherein the points of the locus curve for which position is determined comprise inflection points (15*a*, 15*b*; 21; 31, 32) or extrema (15*c*).

14. A process according to claim 1, characterized in that a plurality of detector coils (4) are arranged across the material flow, whose detection signals are evaluated independently of each other by the formation and evaluation of locus curves.

15. A device for detecting and distinguishing, respectively, parts in a material flow which influence an electromagnetic alternating field, comprising an oscillator (1) and at least one transmitting coil (2) for generating an electromagnetic alternating field extending across the width of a conveying distance of the material flow, at least one detector coil (4) comprising two windings (4*a*, 4*b*) connected inversely for detecting the electromagnetic alternating field and for generating a detection signal (DS) induced by a relative motion between a part located in the material flow and influencing the electromagnetic alternating field and the electromagnetic alternating field in the detector coil, as well as means (7) for detecting a phase signal portion (PS'), characterized by means (12) for the formation of a locus curve from the detection signal, to which means the phase signal portion (PS) and the amplitude signal portion (AS) of the detection signal can be supplied, with the means (12) for the formation of a locus curve being designed such that the progressions of the phase signal portion and the amplitude signal portion of the detection signal are plotted as pairs of variates at the respective points of time in a system of coordinates, the locus curve (15, 20, 30) being composed thereof, and by means (14) for the evaluation of the locus curve with respect to material-specific characteristics and for the emission of an identification signal (ES) upon detection of a material-specific characteristic.

16. A device according to claim 15, characterized in that the means (12) for forming a locus curve and the means (14) for evaluating the locus curve are designed as a signal processor.

17. A device according to claim 16, wherein the signal processor is a digital signal processor (DSP).

18. A device according to claim 15, characterized in that means (6) are provided for adjusting the amplitude signal portion (AS') via a nonlinear characteristic curve.

19. A device according to claim 15, characterized in that means (8) are provided for the determination of an absolute value of the amplitude signal portion (AS") and/or the phase signal portion of the detection signal (DS).

20. A device according to any of claim 15, characterized in that a filter (5) is provided for filtering out interfering signals in the detection signal (DS).

21. A device according to claim 20, wherein the means (12) for forming a locus curve and the means (14) for evaluating the locus curve are integral with each other.

22. A device according to claim 20, wherein the filter (5) is a band-pass filter.

23. A device according to claim 15, characterized in that a low-pass filter (9) is provided for forming the amplitude signal portion (AS''') and/or the phase signal portion of the detection signal (DS).

24. A device according to claim 15, characterized in that the means (12) for evaluating the locus curve comprise image processing means.

25. A device according to claim 15, characterized in that the means (12) for evaluating the locus curve comprise pattern recognition means.

26. A device according to claim 25, characterized in that the means (12) for evaluating the locus curve are designed for the comparison of the locus curve (15, 20, 30) with a predetermined material-specific curve or a family of curves.

27. A device according to claim 26, characterized in that the comparison of the locus curve (15, 20, 30) with a predetermined curve or family of curves includes the detection of at least one measured value of similarity and the comparison of the at least one measured value with at least one set value.

28. A device according to claim 26, wherein the predetermined material-specific curve or family of curves is adjustable.

29. A device according to claim 26, wherein the individual curves of the family of curves represent different purities, geometries or sizes of the detected part influencing the electromagnetic alternating field.

30. A device according to claim 15, characterized in that the means (12) for evaluating the locus curve are designed for the determination of the position of points of the locus curve (15, 20, 30) and for the comparison of these positions with preset positions or limit values or limit ranges (16a, 16b), respectively.

31. A device according to claim 30, wherein the points of the locus curve for which position is determined comprise inflection points (15a, 15b; 21; 31, 32) or extrema (15c).

32. A device according to claim 15, characterized in that the identification signal (ES) is a material-specific identification signal.

33. A device according to claim 15, characterized in that the identification signal (ES) is configured for activating means for the separation of the detected part influencing the electromagnetic alternating field from the material flow.

34. A device according to claim 15, characterized in that a plurality of transmitting coils (2) and detector coils (4) are arranged across the conveying distance of the material flow, wherein one transmitting coil (2) at a time is allocated to a detector coil (4) and the detection signals of the detector coils are formed into locus curves and evaluated independently of each other.

\* \* \* \* \*